(12) United States Patent
Arasu et al.

(10) Patent No.: US 8,200,640 B2
(45) Date of Patent: Jun. 12, 2012

(54) DECLARATIVE FRAMEWORK FOR DEDUPLICATION

(75) Inventors: Arvind Arasu, Redmond, WA (US); Christopher Re, Seattle, WA (US); Dan Suciu, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 428 days.

(21) Appl. No.: 12/484,406

(22) Filed: Jun. 15, 2009

(65) Prior Publication Data

US 2010/0318499 A1 Dec. 16, 2010

(51) Int. Cl.
*G06F 7/00* (2006.01)
*G06F 17/00* (2006.01)

(52) U.S. Cl. .................. 707/692; 707/798; 707/805

(58) Field of Classification Search .................. 707/664, 707/692, 798, 805
See application file for complete search history.

(56) References Cited

U.S. PATENT DOCUMENTS

| | | | |
|---|---|---|---|
| 6,961,721 B2 * | 11/2005 | Chaudhuri et al. | 707/999.001 |
| 7,092,956 B2 * | 8/2006 | Ruediger | 707/602 |
| 7,200,604 B2 | 4/2007 | Forman et al. | |
| 7,287,019 B2 * | 10/2007 | Kapoor et al. | 707/999.002 |
| 7,403,942 B1 * | 7/2008 | Bayliss | 707/748 |
| 2003/0126102 A1 * | 7/2003 | Borthwick | 706/21 |
| 2003/0167253 A1 * | 9/2003 | Meinig | 707/1 |
| 2006/0053129 A1 | 3/2006 | Motwani et al. | |
| 2008/0013830 A1 | 1/2008 | Patterson et al. | |
| 2008/0288482 A1 * | 11/2008 | Chaudhuri et al. | 707/5 |

OTHER PUBLICATIONS

Hall, et al., "Unsupervised Deduplication using Cross-Field Dependencies", , Proceeding of the 14th ACM SIGKDD international conference on Knowledge discovery and data mining, retrieved at <<http://www.cs.umass.edu/~rwhall/crossfield.pdf>>, Aug. 24-27, 2008, pp. 1-8.

Lee, et al., "Cleansing Data for Mining and Warehousing", School of Computing, Technical Report, National University of Singapore,retrieved at <<http://dl.comp.nus.edu.sg/dspace/bitstream/1900.100/1399/1/report.pdf>>, Jun. 1999, pp. 1-21.

Ananthakrishna, et al., "Eliminating Fuzzy Duplicates in Data Warehouses", Proceedings of the 28th VLDB Conference, retrieved at <<http://www.vldb.org/conf/2002/S17P01.pdf>>, Aug. 20-23, 2002, pp. 1-12.

Guha, et al., "Rock: A robust clustering algorithm for categorical attributes", Proceedings of the 15th International Conference on Data Engineering, retrieved at <<http://theory.stanford.edu/~sudipto/mypapers/categorical.pdf>>, Amrch 23-26, 1999, pp. 512-521.

Chaudhuri, et al., "Leveraging Aggregate Constraints for Deduplication", Proceedings of the 2007 ACM SIGMOD international conference on Management of data, retrieved at <<http://research.microsoft.com/users/skaushi/dedup07.pdf>>, Jun. 11-14, pp. 1-11.

Cohen, Williams W., "Integration of Heterogeneous Databases without Common Domains using Queries Based on Textual Similarity", Proceedings of the 1998 ASM SIGMOD international conference on Management of data, retrieved at <<http://www.seas.upenn.edu/~zives/03s/cis650/P201.PDF>>, Jun. 1-4, 1998, pp. 201-212.

(Continued)

*Primary Examiner* — Phong Nguyen

(57) ABSTRACT

A system, framework, and algorithms for data deduplication are described. A declarative language, such as a Datalog-type logic language, is provided. Programs in the language describe data to be deduplicated and soft and hard constraints that must/should be satisfied by data deduplicated according to the program. To execute the programs, algorithms for performing graph clustering are described.

20 Claims, 10 Drawing Sheets

OTHER PUBLICATIONS

Shen, et al., "Constraint-Based Entity Matching", Proceedings of the Twentieth National Conference on Artificial Intelligence, retrieved at <<http://pages.cs.wisc.edu/~whshen/papers/cmediate.pdf>>, Jun. 9-13, 2005, pp. 1-6.

Tung, et al., "Constraint-based clustering in large databases", Proceedings of the 8th International Conference on Database Theory, retrieved at <<http://citeseerx.ist.psu.edu/viewdoc/download?doi=10.1.1.28.9344&rep=rep1&type=pdf>>, Jan. 4-6, 2001, pp. 1-15.

Bhattacharya, et al., "A latent dirichlet model for unsupervised entity resolution", Proceedings of the Sixth SIAM International Conference on Data Mining, retrieved at <<http://www.cs.umd.edu/~indrajit/DOCS/sdm06.pdf>>, Apr. 20-22, 2006, pp. 1-12.

Pasula, et al., "Identity Uncertainty and Citation Matching", Advances in Neural Information Processing Systems 15, retrieved at <<http://people.csail.mit.edu/milch/papers/nipsnewer.pdf>>, 2002, pp. 1-8.

Andritsos, et al., "Limbo: Scalable clustering of categorical data", In 9th International Conference on Extending DataBase Technology (EDBT), retrieved at <<http://www.cs.toronto.edu/~periklis/pubs/edbt04.pdf>>, vol. 2992, Mar. 14-18, 2004 pp. 1-18.

Davidson, et al., "Measuring constraint-set utility for partitional clustering algorithms", 10th European Conference on Principles and Practice of Knowledge Discovery in Databases, retrieved at <<http://ml.jpl.nasa.gov/papers/wagstaff/davidson-constutility-06.pdf>>, Sep. 18-22, 2006, pp. 115-126.

Wagstaff, et al., "When is constrained clustering beneficial, and why?", Proceedings of the Twenty-First National Conference on Artificial Intelligence and the Eighteenth Innovative Applications of Artificial Intelligence Conference, retrieved at <<http://www.wkiri.com/research/papers/wagstaff-constutil-06.pdf>>, Jul. 16-20, 2006, pp. 1-2.

Domingos, et al., "Markov logic: A unifying framework for statistical relational learning", Proceedings of the ICML-2004 Workshop on Statistical Relational Learning and its Connections to Other Fields, retrieved at <<http://www.cs.washington.edu/homes/pedrod/papers/srl04.pdf>>, Jul. 8, 2004, pp. 1-6.

Pfeffer, et al., "Semantics and inference for recursive probability models", Proceedings of the Seventeenth National Conference on Artificial Intelligence and Twelfth Conference on Innovative Applications of Artificial Intelligence, retrieved at <<http://citeseerx.ist.psu.edu/viewdoc/download?doi=10.1.1.43.6388&rep=rep1&type=pdf>>, Jul. 30-Aug. 3, 2000, pp. 1-7.

Singla, et al., "Entity resolution with Markov logic", Proceedings of the Sixth International Conference on Data Mining, retrieved at <<http://www.cs.washington.edu/homes/pedrod/paper/icdm06.pdf>>, Dec. 18-22, 2006, pp. 1-11.

Demaine, et al., "Correlation clustering in general weighted graphs", Theoretical Computer Science, retrieved at <<http://erikdemaine.org/papers/Clustering_TCS/paper.ps>>, vol. 361, No. 2-3, Sep. 2006, pp. 1-20.

Reiter, Raymond., "Equality and domain closure in first-order databases", Journal of the Association for Computing Machinery, retrieved at <<http://delivery.acm.org/10.1145/330000/322189/p235-reiter.pdf?key1=322189&key2=3050118221&coll=GUIDE&dl=GUIDE&CFID=12838441&CFTOKEN=27656596>>, vol. 27, No. 2, Apr. 1980, pp. 235-249.

Sarawagi, et al., "Alias: An active learning led interactive deduplication system", Proceedings of the 28th VLDB Conference, retrieved at <<http://www.it.iitb.ac.in/~sunita/papers/vldb02demo.pdf>>, Aug. 20-23, 2002, pp. 1-4.

Bilgic, et al., "D-dupe: An interactive tool for entity resolution in social networks", IEEE Symposium on Visual Analytics Science and Technology, retrieved at <<http://www.cs.umd.edu/~mbilgic/pdfs/gd05.pdf>>, Oct. 31-Nov. 2, 2006, pp. 1-8.

Parag, et al., "Multi-relational record linkage", 3rd Workshop on Multi-Relational Data Mining in conjunction with the Tenth ACM SIGKDD International Conference on Knowledge Discovery and Data Mining, retrieved at <<http://www.cs.washington.edu/homes/pedrod/papers/mrdm04.pdf>>, Aug. 22, 2004, pp. 1-18.

Bhattacharya, et al., "Collective entity resolution in relational data", ACM Transactions on Knowledge Discovery from Data, retrieved at <<ftp://ftp.research.microsoft.com/pub/debull/A06June/bhattacharya1.ps>>, vol. 1, No. 1, 2007, pp. 1-9.

Fan, Wenfei., "Dependencies revisited for improving data quality", Proceedings of the Twenty-Seventh ACM SIGMOD-SIGACT-SIGART Symposium on Principles of Database Systems, retrieved at <<http://delivery.acm.org/10.1145/1380000/1376940/p159-fan.pdf?key1=1376940&key2=0070118221&coll=GUIDE&dl=GUIDE&CFID=12838678&CFTOKEN=29271381>>, Jun. 9-12, 2008, pp. 159-170.

Bansal, et al., "Correlation Clustering", (The 43rd Annual IEEE Symposium on Foundations of Computer Science, 2002), alsp Published in Kluwer Academic Publishers, retrieved at << http://www.ml.inf.ethz.ch/education/hs_08_seminar_modern_topics_in_pattern_recognition/5_Correlation_Clustering.pdf>>, 2003, pp. 1-28.

Charikar, et al., "Clustering with qualitative information", Elsevier Science Inc, retrieved at <<http://www.cs.mu.oz.au/~awirth/pubs/awirthFocs03.pdf>>, Oct. 3, 2004, pp. 1-32.

Ailon, et al., "Aggregating Inconsistent Information: Ranking and Clustering", The 37th Annual ACM Symposium on Theory of Computing, retrieved at <<http://www.cc.gatech.edu/~deepc/RG/acn.pdf>>, May 22-24, 2005, pp. 684-693.

Gionis, et al., "Clustering aggregation", The 21st International Conference on Data Engineering, retrieved at <<http://www.cs.helsinki.fi/u/tsaparas/publications/aggregated-journal.pdf>>, Apr. 5-8, 2005, pp. 1-27.

Lund, et al., On the hardness of approximating minimization problems, Journal of the Association for the Computing Machinery, retrieved at <<http://delivery.acm.org/10.1145/310000/306789/p960-lund.pdf?key1=306789&key2=7380118221&coll=GUIDE&dl=GUIDE&CFID=12838887&CFTOKEN=21070828>>, vol. 41, No. 5, Sep. 1994, pp. 960-981.

Elmagarmid, Ahmed K., "Duplicate record detection: A survey", Draft Paper, retrieved at <<http://www.cs.purdue.edu/homes/ake/pub/survey2.pdf>>, Aug. 13, 2006, pp. 1-40.

Bilenko, et al., "Adaptive duplicate detection using learnable string similarity measures", Proceedings of the Ninth ACM SIGKDD International Conference on Knowledge Discovery and Data Mining, retrieved at <<http://www.cs.utexas.edu/users/ml/papers/marlin-kdd-03.pdf>>, Aug. 2003, pp. 39-48.

Chaudhuri, et al., "Robust and Efficient Fuzzy Match for Online Data Cleaning", The 2003 ACM SIGMOD International Conference on Management of Data, retrieved at <<http://citeseerx.ist.psu.edu/viewdoc/download?doi=10.1.1.89.231&rep=rep1&type=pdf>>, Jun. 9-12, 2003, pp. 1-12.

Gravano, et al., "Text Joins in an RDBMS for Web Data Integration", Proceedings of the Twelfth International World Wide Web Conference, retrieved at <<http://pages.stern.nyu.edu/~panos/publications/www2003.pdf>>, May 20-24, 2003, pp. 1-12.

Sarawagi, et al., "Interactive Deduplication using Active Learning", Proceedings of the eighth ACM SIGKDD international conference on Knowledge discovery and data mining, retrieved at <<http://www.it.iitb.ac.in/~sunita/papers/kdd02.pdf>>, Jul. 23-26, 2002, pp. 1-10.

Arasu, et al., "Efficient Exact Set-Similarity Joins", The 32nd International Conference on Very Large Data Bases, retrieved at <<http://www.vldb.org/conf/2006/p918-arasu.pdf>>, Sep. 12-15, 2006, pp. 918-929.

Hadjieleftheriou, et al., "Fast Indexes and Algorithms for Set Similarity Selection Queries", IEEE 24th International Conference on Data Engineering, retrieved at <<http://www.research.att.com/~marioh/papers/icde08-1.pdf>>, Apr. 7-12, 2008, pp. 1-10.

Monge, et al., "An efficient domain-independent algorithm for detecting approximately duplicate database records", Research Issues on Data Mining and Knowledge Discovery, retrieved at <<http://citeseerx.ist.psu.edu/viewdoc/download?doi=10.1.1.28.8405&rep=rep1&type=pdf>>, 1997, pp. 1-7.

Sarawagi, et al., "Efficient set joins on similarity predicates", The 23rd ACM SIGMOD International Conference on Management of Data, retrieved at <<http://www.it.iitb.ac.in/~sunita/papers/sigmod04.pdf>>, Jun. 13-18, 2004, pp. 1-12.

Christen, Peter., "Febrl—A Freely Available Record Linkage System with a Graphical User Interface", Proceeding of the 14th ACM SIGKDD international conference on Knowledge discovery and data mining, retrieved at <<http://crpit.com/confpapers/CRPITV80Christen.pdf>>, Aug. 24-27, 2008, pp. 1-9.

Elfeky, et al., "Tailor: A Record Linkage Toolbox", Proceedings of the 18th International Conference on Data Engineering, retrieved at <<http://citeseerx.ist.psu.edu/viewdoc/download?doi=10.1.1.4.2215&rep=rep1&type=pdf>>, Feb. 26-Mar. 1, 2002, pp. 1-12.

Koudas, et al "SPIDER: Flexible Matching in Databases", Proceedings of the ACM SIGMOD International Conference on Management of Data, retrieved at <<http://queens.db.toronto.edu/projects/spider//docs/kms2005-spider.demo.pdf>>, Jun. 14-16, 2005, pp. 1-3.

Chaudhuri, et al., "Robust Identification of Fuzzy Duplicates", Proceedings of the 21st International Conference on Data Engineering, retrieved at <<http://citeseerx.ist.psu.edu/viewdoc/download?doi=10.1.1.116.2666&rep=rep1&type=pdf>>, Apr. 5-8, 2005, pp. 1-12.

Galhardas, et al., "Declarative data cleaning: Language, model, and algorithms", The 27th International Conference on Very Large Databases, retrieved at <<http://www.vldb.org/conf/2001/P371.pdf>>, Sep. 11-14, 2001, pp. 1-10.

Raman, et al., "Potter's Wheel: An Interactive Data Cleaning System", The 27th International Conference on Very Large Databases, retrieved at <<http://control.cs.berkeley.edu/pwheel-vldb.pdf>>, Sep. 11-14, 2001, pp. 1-10.

Bilgic, et al "D-Dupe: An Interactive Tool for Entity Resolution in Social Networks", Lecture Notes in Computer Science, retrieved at <<http://waimea.cs.umd.edu:8080/basilic/web/Publication/2006/bilgic:vast06/ddupe-vast.pdf>>, 2005, pp. 505-507.

Dong, et al., "Reference Reconciliation in Complex Information Spaces", ACM SIGMOD/PODS 2005 Conference, retrieved at <<http://db.cs.washington.edu/semex/reconciliation_sigmod.pdf>>, Jun. 13-16, 2005, pp. 1-12.

Culotta, et al., "Joint Deduplication of Multiple Record Types in Relational Data", Proceedings of the 2005 ACM CIKM International Conference on Information and Knowledge Management, retrieved at <<http://www.cs.umass.edu/~culotta/pubs/culotta05joint.pdf>>, Oct. 31-Nov. 5, 2005, pp. 1-2.

Chandel, et al., "Fast Identification of Relational Constraint Violations", IEEE 23rd International Conference on Data Engineering, retrieved at <<http://leda.science.uoit.ca/kenpu/pdf/icde07-pu.pdf>>, Apr. 15-20, 2007, pp. 1-11.

Bohannon, et al., "Conditional Functional Dependencies for Data Cleaning", IEEE 23rd International Conference on Data Engineering, retrieved at <<http://www.inf.ed.ac.uk/publications/online/0949.pdf>>, Apr. 15-20, 2007, pp. 1-10.

Bohannon, et al., "A Cost•Based Model and Effective Heuristic for Repairing Constraints by Value Modification", In the Proceedings of 24th ACM International Conference on Management of Data, retrieved at <<http://homepages.inf.ed.ac.uk/wenfei/papers/sigmod05.pdf>>, Jun. 14-16, 2005, pp. 1-12.

Cong, et al., "Improving Data Quality: Consistency and Accuracy", 33rd International Conference on Very Large Data Bases, retrieved at <<http://www.vldb.org/conf/2007/papers/research/p315-cong.pdf>>, Sep. 23-28, 2007, pp. 315-326.

Fuxman, et al., "ConQuer: Efficient Management of Inconsistent Databases", Proceedings of the 2005 ACM SIGMOD international conference on Management of data, retrieved at <<http://www.cs.toronto.edu/~afuxman/publications/sigmod05.pdf>>, Jun. 14-16, 2005, pp. 1-12.

* cited by examiner

| id | pos | author |
|----|-----|--------|
| 1 | 1 | A. Gionis |
| 1 | 2 | H. Manilla |
| 1 | 3 | P. Tsaparas |
| 2 | 1 | A. Gionis |
| 3 | 1 | I. Bhattacharya |
| 4 | 2 | L. Getoor |

100

| | id | Title | Publication Venue | Year |
|---|----|-------|-------------------|------|
| ($t_1$) | 1 | Cluster Aggregation | "ICDE" | 2005 |
| ($t_2$) | 2 | Clustering Aggregations | "Conference on Data Engineering" | 2005 |
| ($t_3$) | 3 | Collective entity resolution in relational data | "Data Eng. Bull." | 2007 |
| ($t_3$) | 4 | Collective entity resolution in relational data | "Data Engineering" | 2007 |

Fuzzy Duplicate Records inspired by the ACM Data $$\text{Paper!}(id) :- \quad \text{PaperRefs}(id, -, -, -)$$
$$\text{Publisher!}(p) :- \quad \text{PaperRefs}(-, -, p, -)$$
$$\text{Author!}(id, pos) :- \quad \text{Wrote}(id, pos, -)$$

FIG. 3

$$\text{Paper} * (id, id') \leftrightarrow \text{PaperRefs}(id, t, \_, \_), \text{PaperRefs}(id', t', \_, \_), \text{TitleSimilar}(t, t') \quad (\gamma_1)$$
$$\text{Publisher} * (p, p') \leftrightarrow \text{PublisherSim}(p, p') \quad (\gamma_2)$$
$$\text{Author} * (id, pos, id', pos') \leftrightarrow \text{Wrote}(id, pos, a), \text{Wrote}(id', pos', a'), \text{AuthorSim}(a, a') \quad (\gamma_3)$$
$$\text{Publisher} * (x, y) \Leftarrow \text{PublisherEQ}(x, y) \quad (\gamma_4)$$
$$\neg \text{Publisher} * (x, y) \Leftarrow \text{PublisherNEQ}(x, y) \quad (\gamma_5)$$
$$\text{Publisher} * (x, y) \Leftarrow \text{Publishes}(x, p_1), \text{Publishes}(y, p_2), \text{Paper} * (p_1, p_2) \quad (\gamma_6)$$
$$\neg \text{Author} * (id, i, id, j) \Leftarrow \text{Wrote}(id, i, \_), \text{Wrote}(id, j, \_), i \neq j \quad (\gamma_7)$$
$$\neg \text{Author} * (x, i, y, j) \leftarrow \neg(\text{Wrote}(x, i, \_), \text{Wrote}(y, j, \_), \text{Wrote}(x, p, \_), \text{Wrote}(y, p', \_), \text{Author} * (x, p, y, p')) \quad (\gamma_8)$$

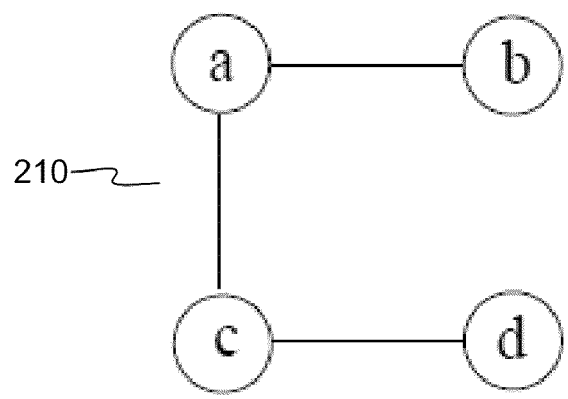
210
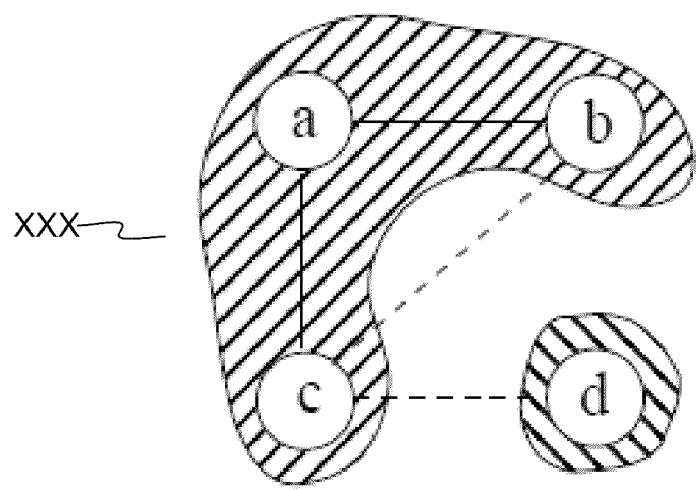
XXX
FIG. 5

260

CLUSTER$(V, \phi)$: $(V, \phi)$ is a clustering graph.
Output: clustering R$*$ of $V$.
   1. Transitive close $(V, \phi)$ wrt rules 1) and 2) below.
   2. Select a permutation $\pi_V$ of $V$ uniform at random.
   3. Extend $\pi_V$ to an order $\pi$ on edges (see below)
   4. While $\exists e$ s.t. $\phi(e) \in \{[+], [-]\}$ do (* exists a soft edge *)
   5.   Pick first soft-edge $e$ in the order $\pi$,.
   6.   if $\phi(e) = [+]$ then set $\phi(e) = [=]$ else $\phi(e) = [\neq]$.
   7.   Deduce edges follows from existing labels (in order by $\pi$).
   8. EndWhile
   9. Return transitively closed subsets of $V$ wrt $\phi(e) = [=]$.

| Head | Hard/Soft | Voting Datalog Queries |
|------|-----------|------------------------|
| Positive | All | $q_\gamma^{[+]}(\vec{x}, \vec{y}) :- \text{BODY}_\gamma[\text{R}_j * \to E_j^{[+]}]$ |
| Positive | Soft | $q_\gamma^{[+]}(\vec{x}, \vec{y}) :- \text{BODY}_\gamma[\text{R}_j * \to E_j^{[=]}]$ |
| Positive | Soft-C | $q_\gamma^{[-]}(\vec{x}, \vec{y}) :- \neg\, q^{[+]}(\vec{x}, \vec{y}), \text{R}_i!(\vec{x}), \text{R}_i!(\vec{y})$ |
| Positive | Hard | $q_\gamma^{[=]}(\vec{x}, \vec{y}) :- \text{BODY}_\gamma[\text{R}_j * \to E_j^{[=]}]$ |
| Negative | All | $q_\gamma^{[-]}(\vec{x}, \vec{y}) :- \text{BODY}_\gamma[\text{R}_j * \to E_j^{[+]}]$ |
| Negative | Soft | $q_\gamma^{[-]}(\vec{x}, \vec{y}) :- \text{BODY}_\gamma[\text{R}_j * \to E_j^{[=]}]$ |
| Negative | Soft-C | $q_\gamma^{[+]}(\vec{x}, \vec{y}) :- \neg\, q^{[-]}(\vec{x}, \vec{y}), \text{R}_i!(\vec{x}), \text{R}_i!(\vec{y})$ |
| Negative | Hard | $q_\gamma^{[\neq]}(\vec{x}, \vec{y}) :- \text{BODY}_\gamma[\text{R}_j * \to E_j^{[=]}]$ |

Input A set $V_i$ of nodes and voting queries for each $\gamma \in \Gamma^{(i)}$
Foreach $\{u,v\} \in \binom{V_i}{2}$
  If exists $\gamma \in \Gamma^{(i)}$ such that $\{u,v\} \in q_\gamma^h$ for $h \in \{[=],[\neq]\}$
  then $\phi(u,v) = h$.
  else (* No hard edge, take the majority vote *)
    $\text{PLUSVOTES}(u,v) = \left|\{\gamma \mid \{u,v\} \in q_\gamma^{[+]}\}\right|$
    $\text{MINUSVOTES}(u,v) = \left|\{\gamma \mid \{u,v\} \in q_\gamma^{[-]}\}\right|$
    if $\text{PLUSVOTES}(u,v) \geq \text{MINUSVOTES}(u,v)$ then
      $\phi(u,v) = [+]$ else $\phi(u,v) = [-]$.

Fix a constraint program $\Gamma$ with $\Gamma_E = \{\texttt{R}_1!, \ldots, \texttt{R}_n!\}$ and instance $\mathfrak{J}$
CLUSTERMANY$(G_L = \{G_1, \ldots, G_{i-1}\}, E_R = \{\texttt{R}_i!, \ldots, \texttt{R}_n!\})$
   Input A set of compiled graphs $G_L$
   Input A set of to-be-compiled entity references $E_R$
   Output A clustering $\texttt{R}_i*$ of each $G_j$ for $j = i, \ldots, n$.
   1. If $E_R = \emptyset$ then return $\emptyset$.
   2. Else use $\texttt{R}_i!$ to perform *Forward-voting* to produce $G_i$
   4.   Let $\mathcal{R} =$ CLUSTERMANY$(G_L \cup G_i, E_R - \{\texttt{R}_i!\})$.
   5.   *Backward-propagate* $\mathcal{R}$ to $G_i$ and cluster to produce $\texttt{R}_i*$
   6.   Return $\{\texttt{R}_i*\} \cup \mathcal{R}$

FIG. 10

DECLARATIVE FRAMEWORK FOR DEDUPLICATION

BACKGROUND

Deduplication is a process of identifying references in data records that refer to the same real-world entity. A common example is the case where two data records refer to a same person, but with different name spellings or with related address records that have minor differences. Deduplication is often used in data cleaning processes. Collective deduplication is a generalization of finding types of real-world entities in a set of records that are related. For example, in a collective deduplication scenario, given a database of paper (e.g., journal article) references, an ideal system would identify all records that refer to the same paper. Such a system might also produce a duplicate-free set of all conferences in which a paper was published. It might be assumed that the same paper is not published in several conferences, and this constraint might be expected to hold in the deduplicated output. In general, the output of collective deduplication may be a set of several partitions of the input records (by entity type) that satisfy constraints in the data. FIG. 1 shows a concrete example of a deduplication scenario. A database may have a table of authors 100 and a table of papers 102, which may be related to the table of authors 100 by a common key or identifier ("id"). A deduplication process might identify papers and/or authors that are determined to be duplicates (a group of duplicates may be referred to herein as a cluster).

Prior approaches to deduplication have focused on string similarity, working under the assumption that two strings that are sufficiently similar to each other are likely to correspond to the same real-world entity. However, string similarity alone may not capture constraints that naturally hold in a given set of data. As a result, many clustering algorithms do not incorporate constraints. Furthermore, most prior approaches to database deduplication are inflexible because: (1) they may only allow clustering of a single entity type (e.g., author, or paper, or conference) in isolation, which makes it is difficult to answer queries that refer to multiple entity types such as, "how many distinct papers were in ICDE 2008?"; (2) they may ignore constraints, which prevents users from encoding valuable domain knowledge; or (3) they may use constraints in an ad-hoc way which prevents users from flexibly combining constraints to suit their application needs.

Described below is a declarative framework for collective deduplication of entity references in the presence of constraints, including a language for specifying deduplication constraints, and algorithms for executing programs in the language.

SUMMARY

The following summary is included only to introduce some concepts discussed in the Detailed Description below. This summary is not comprehensive and is not intended to delineate the scope of the claimed subject matter, which is set forth by the claims presented at the end.

A system, framework, and algorithms for data deduplication are described. A declarative language, such as a Datalog-type logic language, is provided. Programs in the language describe data to be deduplicated and soft and hard constraints that must/should be satisfied by data deduplicated according to the program. To execute the programs, algorithms for performing graph clustering are described.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

FIG. 1 shows a concrete example of a deduplication scenario.
FIG. 3 shows contents of entity reference relations declared in Datalog.
FIG. 4 shows a program of constraints.
FIG. 5 shows a graphical representation of the basic correlation clustering of Example 2.2.
FIG. 7 shows an algorithm for performing deduplication.
FIG. 8 shows a table of queries generated for voting.
FIG. 9 shows an election (voting) algorithm.
FIG. 10 shows an algorithm for clustering.

DETAILED DESCRIPTION

Overview

Figure 2:
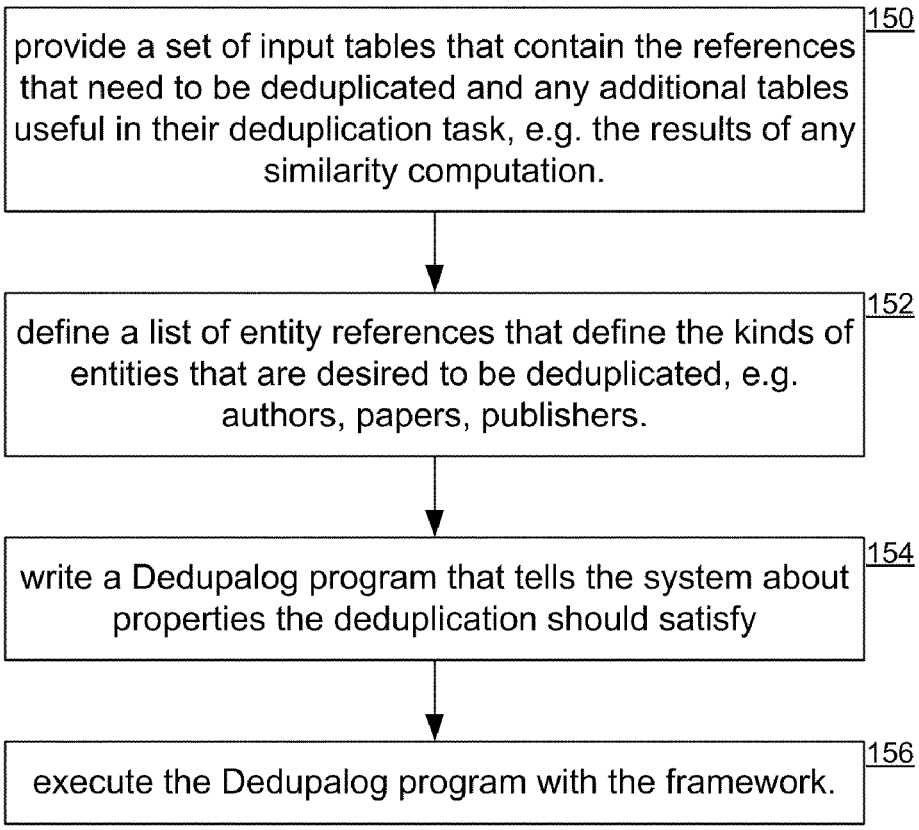
FIG. 2 shows a workflow of how one may use Dedupalog.

Embodiments discussed below relate to a declarative framework for collective deduplication of entity references in the presence of constraints. First, some aspects of constraints in general will be discussed. Then, a formal model will be presented. Algorithms for implementing a declarative framework for collective deduplication will be described next, followed by discussion of extensions for improving execution of the framework.

Constraints and Language for Specifying Same

Constraints, which arise naturally in many settings, vary widely. A simple constraint is one that arises from user feedback. For example, a user may tell a deduplication system that "ICDE" and "Conference on Data Engineering" are the same conference, or conversely, that "Data Engineering Bulletin" and "Data Engineering" are distinct publications. However, not all constraints can be specified one pair at a time. More complicated constraints such as 'conferences in different cities, are in different years' would be well-suited to be specified in some arbitrary declarative language. A framework described herein may allow a wide variety of constraints to be declared, flexibly combined, and efficiently processed.

A language described herein, referred to as Dedupalog, may be used for collective deduplication. As will become apparent, Dedupalog is a declarative and domain-independent language, yet it is expressive enough to encode many constraints while scaling to large data sets. In some embodiments, Dedupalog may allow users to specify both hard and soft constraints. For example, one may specify a hard constraint that "every paper has a single publisher". Dedupalog may also allow specification of soft constraints, e.g. "papers with similar titles are more likely to be clustered together". In practice, users specify a Dedupalog program and algorithms described below produce a clustering that minimizes the number of soft constraints that are violated, while ensuring that no hard constraint is violated.

Efficient, scalable algorithms implementing for the Dedupalog language will be described. Such algorithms are difficult to create as the problem to be solved optimally is NP-hard. In fact, for some natural variants of the clustering problem it has been believed that there is no algorithm that can give a bounded approximation guarantee. In spite of these assumptions, for a large class of Dedupalog programs, it can be proven that implementing algorithms cluster approximately optimally. Practically, in spite of the fact that such clustering algorithms described herein are approximate, they yield a high precision-recall on standard datasets such as Cora (p=0.97, r=0.93). Additionally, the algorithms are scalable and can cluster large datasets efficiently. For example, a prototype clustered the papers and conferences in the ACM citation database, which contains over 465,000 records, in approximately 2 minutes. In contrast, most prior deduplication approaches have been confined to much smaller datasets, such as Cora, that contain on the order of a thousand records.

Formal Deduplication Model

FIG. 2 shows a workflow of how one may use Dedupalog. The process may include four steps. First, a user provides 150 a set of input tables that contain the references that need to be deduplicated and any additional tables (e.g., tables 100 and 102) useful in the deduplication task, e.g. the results of any similarity computation. Then the user defines 152 a list of entity references that define the kinds of entities that the user would like to deduplicate, e.g. authors, papers, publishers. The user then writes 154 a Dedupalog program that tells the deduplication system about properties the user's particular deduplication should satisfy. Finally the user executes 156 the Dedupalog program using a framework. After such execution 156, the system deduplication system produces a deduplication of the user's original data that takes into account the constraints in the written 154 program. This section, will describe the defining 152 and writing 154 in more detail.

A. Declaring Entity References

The defining 152 a list of entity references when using Dedupalog, may involve declaring a list of entity references by declaring a set of entity reference relations that contain the references that user wants deduplicated (for short, "deduped"). For example, consider a user with the data tables 100 and 102 that wants to deduplicate the papers, publishers and authors contained in the data. To inform the system that the user wants these three references deduplicated the user declares three entity reference relations: papers (Paper!), publishers (Publisher!) and authors (Author!). Each tuple in these relations corresponds to a single entity reference. Creating the data in the entity reference relations can be done using any relational view definition language. The Dedupalog framework may be able to proceed with information of the schema of these relations or similar information. FIG. 3 shows contents 170 of the entity reference relations declared in Datalog. When declaring entity references, the user has the freedom to make some design choices. For example, in FIG. 3 the user has decided that each reference to an author in the data should be clustered. In particular, there are two references to authors named 'A. Gionis' (see table 100). This decision is appropriate for author names since it is likely that there are two author references that have the same name, but actually refer to different people. However, if two publisher names are identical, then they almost certainly do refer to the same publishing company. As a result, the declaration 172 of Publisher! specifies that there is a single entity for each string; in the field of deduplication this is known as a unique names assumption. Dedupalog works equally well with either decision.

B. Dedupalog by Example

For each entity reference relation declared in the previous step, e.g. R!(x), Dedupalog creates a clustering relation, denoted R*(x, y) that contains duplicate pairs of objects. For example, Author*(x, i, y, j) is a clustering relation containing duplicate references in Author!(x, i). Clustering relations are similar to standard intensional database predicates (views), but are not identical to standard IDBs: Clustering relations should be equivalence relations (an equivalence relation is reflexively, symmetrically, and transitively closed, and a clustering relation R* is an equivalence relation on R!). Algorithms described below may populate the clustering relations, which are the building block of Dedupalog rules.

1) Soft-complete Rules: The first type of rule Dedupalog allows are called soft-complete rules and are denoted with a "soft-iff" (<–>). These are the workhorse rules in Dedupalog. In one embodiment, each clustering relation is required to have at least one soft-complete rule. An example a soft-complete rule is "papers with similar titles are likely duplicates". To express this in Dedupalog, one would create a standard relation, TitleSimilar, of highly similar title pairs in the providing step 150 of the deduplication process. The following soft-complete rule can then be written:

Paper*(id, id')<–>PaperRefs(id, t,-,-,-),

PaperRefs(id', t',-,-,-),

TitleSimilar(t, t') $(\gamma_1)$.

This rule says that paper references whose titles appear in TitleSimilar are likely to be clustered together. Conversely, those pairs that are not mentioned in TitleSimilar are not likely to be clustered together, hence the 'soft-iff'. Informally, when a clustering violates a soft rule, it pays a cost, which deduplication algorithms described below may use to attempt to violate as few soft rules as possible.

2) Soft-incomplete Rules: In addition to soft-complete rules, Dedupalog allows another type of soft-rule called soft-incomplete rules (soft rules are rules which should not be violated, i.e., an algorithm attempts to avoid violating such a rule, although it may do so under various conditions). For example, if a table has a set of titles that are very similar, a user may wish to tell a dedupalog-implementing system that these titles are very likely clustered together:

Paper*(id, idO)<-PaperRefs(id, $t$,-,-,-),

PaperRefs(idO, tO,-,-,-),

TitleVerySimilar(t, tO) $(\gamma_{li})$.

Soft-incomplete rules differ from soft-complete rules in that they give positive information. For example, $\gamma_{li}$ is added, any clustering will pay a penalty only if it does not cluster pairs of titles in TitleVerySimilar together. This contrasts with soft-complete rules, which pay a cost when pairs not returned by the rule are clustered together.

3) Hard Rules: Dedupalog may also allow hard rules. The simplest examples of hard rules are "the publisher references listed in the table PublisherEQ must be clustered together" and "the publisher references in PublisherNEQ must not be clustered together", which may be expressed in Dedupalog as:

Publisher*(x, y)<=PublisherEQ(x, y) $(\gamma_4)$

¬Publisher*(x, y)<=PublisherNEQ(x, y) $(\gamma_5)$.

These rules are called hard rules because they must be satisfied in any legal clustering. These types of rules are sometimes referred to as must-link ($\gamma_4$) and cannot-link ($\gamma_5$) constraints. These simple rules allow Dedupalog to support user feedback or active learning, which may improve the quality of clustering. For example, using this feature, an interactive application may be implemented that deduplicates the publisher and journal references in the ACM data.

4) Complex Hard Rules: In general, hard rules may be more sophisticated, involving joins with clustering relations:

Publisher*(x, y)<=Publishes(x, p1),

Publishes(y, p2), Paper*(p1, p2)   ($\gamma_6$)

This Dedupalog rule ($\gamma_6$) states that whenever two papers are clustered (i.e., are deemed to be duplicates), the publishers of those papers must also be clustered. In other words, the rule specifies that a functional dependency holds between papers and their publishers. These constraints are helpful for collective deduplication. If the target data is very dirty, the above hard rule may be too strong, in which case Dedupalog allows the rule ($\gamma_6$) to be a soft-incomplete rule by replacing "<=" with "<-".

5) Complex Negative Rules: An example of a complex negative rule is the constraint that two distinct author references on a single paper cannot be the same person, in Dedupalog:≠

¬Author*(x, y)<=Wrote(p, x, i), Wrote(p, y, j), i≠j   ($\gamma_7$)

Here, Wrote(p, a, i) is a relation that says that author reference a appeared at position i on paper reference p. This constraint is useful for disambiguation. For example, if there is a paper with two authors named 'W. Lee', then it can be inferred that there are at least two distinct persons with the name 'W. Lee' in the data. Although not illustrated, an embodiment of Dedupalog may allow negation in the body of the rule (the body is the part of the rule lying to the right of the "<=" symbol).

6) Recursive Rules: Consider the constraint "Authors that do not share common coauthors are unlikely to be duplicates". After clustering, one may discover that two authors do share a co-author and so should be clustered. To express this constraint, one may inspect the current clustering, and that may be done using recursion:

¬Author*(a, aO)<- ¬(Wrote(a, $p_1$), Wrote(a', $p_2$),

Wrote(z, $p_1$), Wrote(z', $p_2$),

Author*(z, z'))   ($\gamma_8$)

These constraints are sometimes called groupwise constraints. In general, groupwise constraints may involve aggregation functions, e.g. SUM, which might not supported in some embodiments of Dedupalog.

It is possible that a Dedupalog program may contain conflicts, e.g. the hard rules in a program may simultaneously specify that two papers both must-be clustered and cannot-be clustered together. In these cases, the conflicts may be detected by the system and reported to the user. Detecting and reporting conflicts can be useful for the user during deduplication, as doing so notifies the user of erroneous values which may otherwise be hard to find. For detecting inconsistencies in data using conditional dependencies, techniques described in the following two references may be incorporated into a Dedupalog runtime: P. Bohannon, W. Fan, F. Geerts, X. Jia, and A. Kementsietsidis, "*Conditional functional dependencies for data cleaning,*" in ICDE, 2007, pp. 746-755.; W. Fan, "*Dependencies revisited for improving data quality,*" in PODS, 2008, pp. 159-170.

C. Formal Syntax and Semantics

FIG. 4 shows a program 190 of constraints. Examples of soft constraints are rules $\gamma_1$, $\gamma_6$, and $\gamma_{6b}$, the rest are hard constraints and $\gamma_{6r}$ is a recursive constraint. To understand the example program 190, consider the following. For discussion, let / be an input instance that consists of the extensional database predicates (EDBs) that contain standard database relations, entity reference relations, the output of similarity computation, etc. Furthermore, Let J* denote an instance of the EDBs and the IDBs (intensional database predicates), which are the clustering relations. The asterisk superscript emphasizes that it may contain the transitively closed clustering relations. A Dedupalog rule is a statement in one of the three following forms:

HEAD<->BODY(Soft-complete rule)

HEAD<-BODY(Soft-incomplete rule)

HEAD<=BODY(Hard rule)

where HEAD is a positive IDB symbol, e.g. Papers*, or a negated IDB symbol, e.g. ¬ Papers*, and BODY is a conjunction of EDB predicates (possibly negated) and at most one IDB predicate. Further, in one embodiment, hard rules may only contain a positive body and be non-recursive. If there is a restriction that a hard rule may contain only a single, it may help to ensure that positive IDB predicate rules can be easily inverted. For example, consider $\gamma_6$ FIG. 4. If one chooses not to cluster two publisher references together, then one can immediately determine which paper references may not be clustered together. In another embodiment, soft-complete rules satisfy an additional constraint; their BODY may contain no clustering relations, e.g. $\gamma_j$ for j=1, 2, 3 in FIG. 4.

Definition 2.1: Given as input a program Γ, which is a set of rules, and an instance I, an instance J* of a of the IDBs and EDBs is a valid clustering if three conditions are met: (1) J* agrees with the input instance I on the EDBs, (2) each clustering relation R* in the IDBs is an equivalence relation on the elements of R!, the corresponding entity-reference relation, and (3) each hard-rule is satisfied by j* in the standard sense of first-order logic.

EXAMPLE 2.1

Consider a program with a single soft-complete rule R*(p1, p2)<->E(p1, p2) where I is such that R!={a, b, c, d} and E be the symmetric closure of {(a, b), (a, c), (c, d)}. FIG. 5 shows a graphical representation of the basic correlation clustering of Example 2.2. Graph 210 shows the relation E. Graph 212 shows clustering. The edges that contribute to the cost are illustrated with dashed lines. Note that any partition of R!, e.g. {{a, b, c} {d}}, is a valid clustering. This partitioning is illustrated in by graph 212. Informally, the cost of a clustering J* is the number of tuples in the output of soft-rules, i.e. either soft-complete or soft-incomplete, that are violated.

Definition 2.2: For a soft rule γ, the cost of clustering J* with respect to—denoted as Cost(γ, J*)—may be defined to be the number of tuples on which the constraint and the corresponding clustering in J* disagree. If γ is soft-complete, then its cost on J* is:

$$\text{Cost}(\text{HEAD}(i, j) < -> \text{BODY}, J^*) \stackrel{def}{=}$$
$$|\{\{i, j\} | i \neq j \text{ and } J^* \not\models \text{HEAD}(i, j) \Leftrightarrow (\text{BODY}(i, j))\}|$$

else, γ is soft-incomplete and its cost on J* is:

$$\text{Cost}(\text{HEAD}(i, j) < -\text{BODY}, J^*) \stackrel{def}{=}$$
$$|\{\{i, j\} | i \neq j \text{ and } J^* \not\models \text{HEAD}(i, j) \Leftarrow (\text{BODY}(i, j))\}|$$

Note that BODY(i, j) means that all head variables are replaced with constants, and the others are existentially quantified. The cost of a valid clustering J* with respect to an entire program Γ is given by the equation:

$$\text{Cost}(\Gamma, J^*) \stackrel{\text{def}}{=} \sum_{\gamma \in \Gamma_{Soft}} \text{Cost}(\gamma, J^*)$$

where $\Gamma_{Soft}$ is the set of all soft rules in Γ.

EXAMPLE 2.2

The cost of the clustering in graph 212 is: Incur cost of one for placing c and d in different clusters, since (c, d) ∈ E and one cost for placing a and c in the same cluster, since (a, c) ∉ E. This is the setting of correlation clustering on a complete graph. The cost above is known as the disagreement cost. Notice that there is no clustering of this input with cost 0.

Consider a slightly different single program: R*(x, y)<–> E2(x, y, z). Considering any input where E(x, y)⇔∃z E2(x, y, z), then although this program is distinct from the previous example, any clustering has the same cost for both programs. In particular, the fact that there is a variable, z, that is projected out does not affect the cost.

One goal may be to find a valid clustering J* that minimizes Cost(Γ, J*). As was discussed in Example 2.2, it may not be possible to obtain a clustering J*, such that Cost(Γ, J*)=0, since I may contain inconsistent information. Thus, one may consider the following problem:

Deduplication Evaluation Problem: Given a constraint program Γ and an input instance I, construct a valid clustering J* of I such that J* minimizes Cost(Γ, J*).

It is known that finding the optimal clustering for a single soft-complete constraint is NP-Hard. Concretely, the program R*(x, y)<–E(x, y) suffices. Typically, these problems are hard to even approximate. For example, it is believed that minor variations of the problem do not have constant factor approximations and obtaining even an unbounded (log n factor) approximation is non-trivial. However, in the next section it will be shown that for a large fragment of the Dedupalog language, algorithm embodiments may be a constant factor approximation of the optimal solution.

Deduplication Framework

Figure 6:
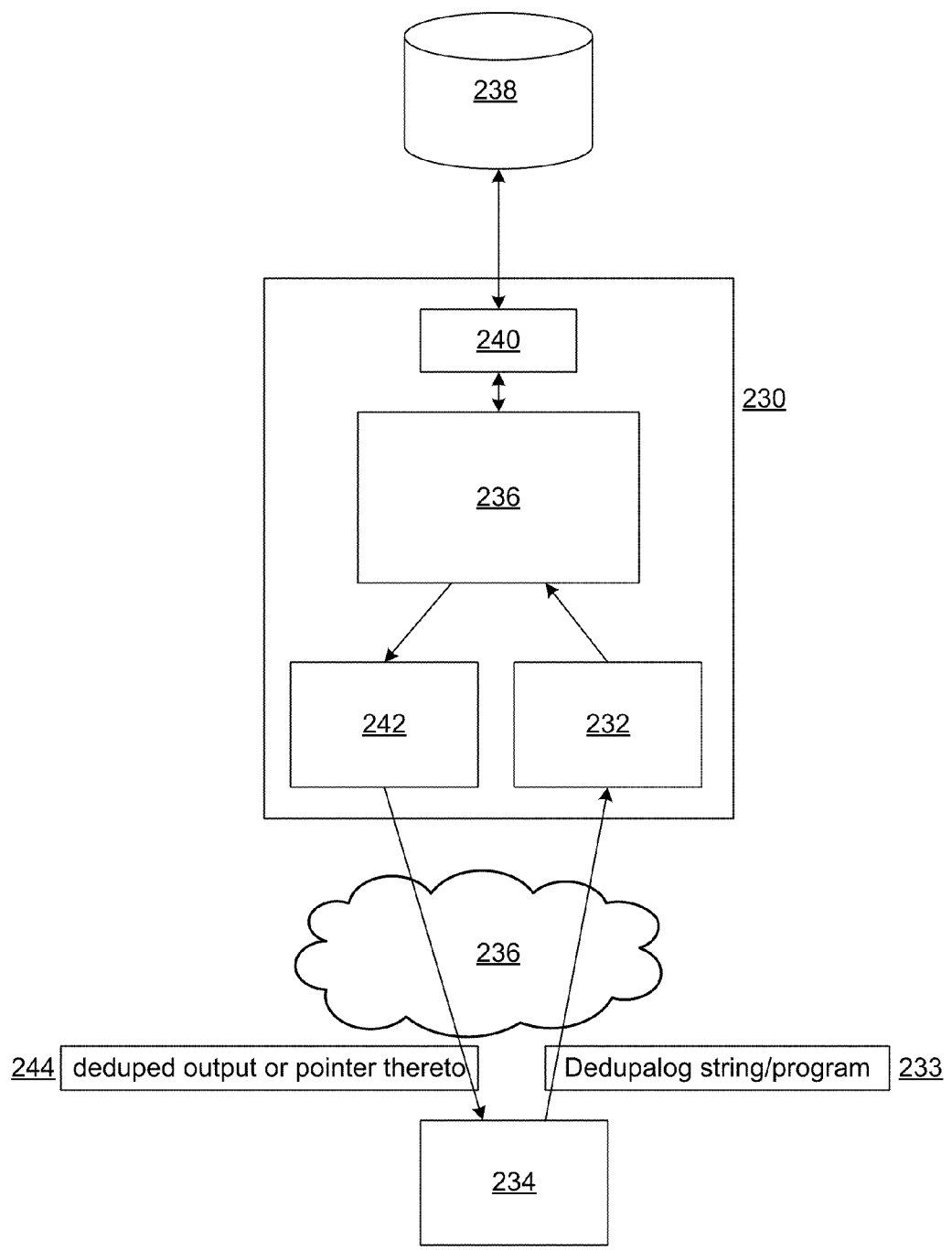
FIG. 6 shows a deduplication framework.

Before proceeding to explanation of deduplication algorithms, a concrete framework and system will be described. FIG. 6 shows a deduplication framework. A computer 230, which may in practice be a cluster of cooperating computers, has memory and one or more processors (not shown), which perform various of the operations and steps of the framework. The computer 230 has a receiving unit 232 that receives a deduplication string or program 233 (defining a Dedupalog program) from one or more clients 234, which may be transmitted via a network 236. In one embodiment, the client is a program running on the same computer as the framework. The receiving unit 232 passes the program 233 to an execution unit 236. The execution unit is configured with computer instructions that, possibly in addition to other operations, implement one or more graph clustering algorithms (described below) for executing the program 233.

The execution unit may parse the program 233 and in the process identifies various elements of database 238 that will be needed to execute the program 233. The identified database elements (e.g., columns, tables, rows, indices, schemas, etc.) that will be used are accessed with any type of database communication interface 240, which may be configured to handle communications with a database server serving the database 238. The execution unit 236 executes the program 233 using the accessed database elements and returns via a reply unit 242 deduplicated output 244. In practice, receiving unit 232 and reply unit may be one integrated unit.

One of ordinary skill in the art of programming will appreciate that the design of the framework in FIG. 6 is one of many possible variations and the functionality performed (primarily execution of a program specifying a deduplication and its constraints) is of greater significance than the somewhat arbitrary division of functions into different cooperating units or modules.

Deduplication Algorithms

In this section, algorithms are outlined and tested optimizations are described. For ease of presentation, first will be explained a novel theoretical clustering algorithm on graphs, called clustering graphs, that forms the technical basis of this approach. It is then explained how to use the graph clustering algorithm to evaluate Dedupalog programs. Finally described are physical optimizations (execution strategies) that allow the algorithms to scale to large datasets.

A. Clustering Graphs

The input to the problem to be solved by a deduplication algorithm is modeled as a clustering graph, which is a pair (V, φ), where V is a set of nodes and φ is a symmetric function that assigns pairs of nodes to labels, i.e. φ: $\binom{V}{2}$→{[+], [−], [=], [≠]}. A clustering graph may be thought of as a complete labeled graph; the nodes of the graph correspond to an entity reference and each edge is labeled (by φ) with exactly one of four types: soft-plus ([+]), soft-minus ([−]), hard-plus ([=]) and hard-minus ([≠]). The goal is to produce a clustering, i.e. an equivalence relation R* on V such that: (1) all hard edges are respected, that is if φ(u, v)=[=] then (u, v) ∈ R* and if φ(u, v)=[≠] then (u, v) ∉ R* and (2) the number of violations of soft edges is as few as possible, where an edge (u, v) is violated if φ(u, v)=[+] and (u, v) ∉ R*, or if φ(u, v)=[−] and (u, v) ∈ R*. FIG. 7 shows an algorithm 260 that is able to achieve a factor of 3, in spite of hard constraints. Extensions, such as adding "don't care" edges which cause no penalties, are believed to have no constant factor approximation.

Algorithmic Details. The central operation the algorithm 260 performs is hardening an edge e, which means that the algorithm transforms the label of an edge e from a soft label, i.e. one of {[+], [−]}, into a hard label, i.e. one of {[=], [≠]}. After hardening an edge, the algorithm deduces as many constraints as possible, using the following two rules:

If φ(u, v)=[=] and φ(v,w)=[=], set φ(u,w)=[=].  1)

If φ(u, v)=[=] and φ(v,w)=[≠], set φ(u,w)=[≠].  2)

Informally, these rules are sound, i.e. every edge label deduced by these rules is correct, and complete, i.e. if an edge has a hard label h in every clustering, then these rules deduce h. The order in which these rules are applied during execution may sometimes be significant. To specify that order, the algorithm may uniformly chose a random permutation of nodes, $\Pi_V$: V→{1 . . . |V|} (Line 2). This gives a partial order on edges, ⊑ defined as:

min($\Pi_V(x), \Pi_V(y)$)<min($\Pi_V(u), \Pi_V(v)$)⇒(x, y) ⊑ (u, v)

An arbitrary total order Π is picked that extends ⊑. In lines 4 and 5, the algorithm 260 uses Π to pick the first soft-edge, e, and then hardens e. The algorithm 260 continues in the loop (Lines 4-8), until the soft edges have been hardened. In the final graph, a clustering is exactly the [=]-connected components. In the main, the result of this subsection is that algorithm 260 returns a clustering that is within a factor 3 of the optimal.

Theorem 3.1: If there exists a clustering of (V, φ), algorithm 260 produces a clustering. Further, assuming R*=CLUSTER (V, φ) and Opt denote the optimal (lowest cost) clustering of (V, φ) then $$E_\Pi[\text{Cost}(R^*, V, \phi)] \leq 3 \text{ Cost}(\text{Opt}, V, \phi)$$

where E is taken over the random choices of the algorithm.

The claim of the theorem follows from the soundness and completeness of the rules 1) and 2) above. The second claim of the theorem, that that algorithm 260 is 3-approximation in expectation, uses the primal-dual schema technique (see V. Vazirani, Approximation Algorithms, Springer-Verlag, 2003, chapters 12-26).

B. Compiling and Executing a Dedupalog Program

This section explains how to compile and execute a Dedupalog program Γ to obtain a clustering of all entity references in Γ. The algorithm has two-stages, Forward-voting and Backward-propagation. The Forward-voting stage executes first; it takes as input a program Γ and an instance I, and produces as output a list of clustering graphs, $G_1, \ldots, G_n$ where n is the number of entity references in Γ. The second stage, Backward-propagation, takes as input the clustering graphs produced in Forward-voting and uses algorithm 260 to produce the clusterings, $R_1^*, \ldots, R_n^*$. These two stages are now explained in detail. During these two stages, the transitive closure property for each individual graph will be assured. For the moment, it may be assumed that Γ does not contain any (self)-recursive rules, e.g. $\gamma_8$ in FIG. 4.

1) Forward-voting: For i=1, ... n, let $\Gamma^{(i)}$ be the set of rules in Γ that have $R_i^*$ in the HEAD. Forward-voting is an inductive procedure. Without loss, the entity references $R!_1, \ldots, R!_n$, are ordered such that if there is some γ ∈ Γ such that $R_i^* \in \text{BODY}\gamma$ and $R_j^* \in \text{HEAD}$, then i≤j. Inductively at stage i, Forward-voting has produced graphs $G_1, \ldots, G_{i-1}$ such that for j<i the nodes in graph $G_j$ are exactly the values in entity reference relation Rj!. A goal may be to produce a clustering graph $G_i=(V_i, \phi_i)$ that corresponds to $R_i!$. The nodes of $G_i$, $V_i$, are exactly the entity references in $R_i!$. The decision the algorithm should make is how to label the edges in $G_i$, i.e. how $\phi_i$ assigns values to elements of $\binom{V_i}{2}$. Each constraint in $\Gamma^{(i)}$ offers a vote for the label assigned to an edge e in $G_i$. For example, recall $\gamma_6$ (FIG. 4):

Publisher*(x, y)<=Publishes(x, p₁), Publishes(y, p₂),
    Paper*(p₁, p₂)

If two papers are likely to be clustered together, then it is also likely that their publishers should be clustered together. Specifically, the pair of papers $t_1$ and $t_2$ in FIG. 1 (table 102) are similar, hence the rule $\gamma_6$ "casts a vote" that their publishers should be clustered; here, the rule says to cluster "ICDE" and "Conference on Data Engineering".

a) Counting votes with queries: FIG. 8 shows a table 280 of queries generated for voting given a constraint γ with BODYγ and free variables $\vec{x}$ corresponding to the first entity and $\vec{y}$ corresponding to the second entity. The Head column of table 280 indicates whether the head of γ must be negative or positive to generate the associated query. Hard/Soft indicates whether the query is generated when γ is hard, soft, soft-complete (Soft-C) or in all cases. The substitution in the body is for each j<1, i.e., each occurrence of $R_j^*$ is replaced with an edge relation, $E_j^z$ for some z ∈ {[+], [−], [=], [≠]}.

For each Dedupalog rule γ ∈ $\Gamma^{(i)}$, the voting algorithm executes one or more queries based on whether γ's head is positive or negative and whether it is hard or soft. These queries are referred to as voting queries. For each Dedupalog rule γ ∈ $\Gamma^{(i)}$ and for each entry in table 280 such that γ satisfies the conditions listed in the first two columns, a voting query is created. For example, $\gamma_6$ is positive and hard; according table 280 two Datalog queries, $q_{\gamma_6}^{[+]}$ and $q_{\gamma_6}^{[=]}$ are generated.

To construct the bodies of the voting queries, replace any occurrence of $R_j^*$ for j<i in the BODY of γ with either $E_j^{[+]}$ or $E_j^{[=]}$ as specified by the entry in table 280, where $$E_j^{[+]} \stackrel{def}{=} \{\vec{e} \mid \phi_j(\vec{e}) = [+]\},$$

i.e. the current [+] edges in j. $E_j^{[=]}$ is defined analogously. This is denoted by BODYγ $[R_j^* \to E_j^z]$ for z ∈ {[+], [=]} in table 280. Performing this substitution in $\gamma_6$, yields two Datalog queries:

$q_{\gamma_6}^{[+]}(x, y):-\text{Publishes}(x, p_1), \text{Publishes}(y, p_2),$
    $E_{paper}^{[+]}(p1, p2)$ $q_{\gamma_6}^{[=]}(x, y):-\text{Publishes}(x, p_1), \text{Publishes}(y, p_2),$
    $E_{paper}^{[=]}(p1, p2)$ The first query, $q_{\gamma_6}^{[+]}$ says that if two papers are likely to be clustered, then their publishers should likely be clustered together as well. The second query, $q_{\gamma_6}^{[=]}$, asserts that if two papers must be equal, then their publishers must be equal.

If $\gamma_6$ were soft, i.e. replace <= with <−, then instead of two queries, generate one query, $q_{\gamma_6}^{[+]}$, but now with two rules. The bodies of these rules are identical to those above. This may be thought of as the idea that soft-rules cannot force two pairs to be together; soft-rules only say that they are likely to be together, i.e. they cast only [+] votes.

b) Electing edge labels: FIG. 9 shows an election (voting) algorithm 290. Given the voting queries, the labels for the edges in graph $G_i=(V_i, \phi_i)$ are constructed. For any pair {u, v} ∈ $\binom{V_i}{2}$, select the edge according to the following procedure in algorithm 290. To help understand, consider that if there is a vote for a hard label h, then h is the label of that edge (if there are two different hard labels, then there is a contradiction and this is reported to the user, as previously described). If there are no hard labels for the pair {u, v} then φ(u, v) takes the majority label.

EXAMPLE 3.1

Continuing with the Publisher! entities, there are two Dedupalog rules that vote for edges between publishers: (1) the hard constraint $\gamma_6$ (above); and (2) the soft-complete rule $\gamma_3$. The $\gamma_3$ rule casts a [+] vote for each pair of publishers that are listed in PublisherSim, i.e. are textually similar. Consider the references t1 and t2 from FIG. 1. Here, the string similarity between publishers shows that "ICDE" and "Conference on Data Engineering" are not close as strings. However, t1 and t2 are likely to be merged, and so there will be a vote for [+] from $\gamma_6$ and one vote for [−] from $\gamma_3$. Thus, these two publishers are more likely to be clustered with $\gamma_6$.

At the end of Forward-voting, a list of clustering graphs $G_1 \ldots G_n$ has been produced.

2) Backward-propagation: After Forward-voting has completed, the Backward-propagation stage is started. This stage proceeds in the opposite order of Forward-voting: At stage i, a clustering $R_k^*$ of $G_k$, for k>i is produced. Let $\Gamma_{(i)}$ be the set of hard rules in Γ that contain $R_i^*$ in the body. For any rule γ in $\Gamma_{(i)}$, the HEAD of γ is $R_k^*$ for some k>i. If {x, y} ∉ $R_k^*$, then for any pair {u, v} such that γ(x, y) holds whenever {u, v} ∉ $R_i^*$, then clustering u and v together would violate a hard constraint. Hence, to prevent this when clustering $G_i$, set φ(u, v)=[≠]. Now, cluster $G_i$ using the clustering algorithm 260 (FIG. 7) and recurse.

3) Recursive Constraints. Recursive rules are confined to a single graph and are always soft. During the execution of algorithm 260, the votes for each edge and which rule cast that vote are tracked. Naively, the query could be re-evaluated, and the votes updated to again take the majority. However, since only relatively few edges change labels per iteration, an incremental strategy would be preferable, e.g. using classical techniques to incrementally evaluate Datalog as described by j. D. Ullman, Principles of Database and Knowledge-Base Systems, Volume I. Computer Science Press, 1988, p. 124.

The main result of this section is that CLUSTERMANY returns a valid clustering and if there are no hard rules between entity references, the algorithm is a constant factor approximation.

Theorem 3.2. If there exists a valid clustering for a constraint program $\Gamma$ on entity relations $R_1!, \ldots, R_n!$ and input instance I, then CLUSTERMANY (algorithm 300, FIG. 10) returns a valid clustering J*. Let Opt be the optimal clustering of $\Gamma$ and I. If $\Gamma$ is such that for any hard rule $\gamma \in \Gamma$, BODY$\gamma$ contains no clustering relations, then CLUSTERMANY returns a clustering that has cost within a constant factor of the optimal. Formally, $$E[\text{Cost}(\Gamma, J^*)] \leq k \, \text{Cost}(\Gamma, \text{Opt})$$

where $k=6 \max_i |\Gamma^{(i)}|$ and E is over the choices of CLUSTERMANY.

The proof of the first part of the claim follows by construction. While the cost bound follows from three costs: (1) clustering a graph costs a factor of 3 (1) $|\Gamma^{(i)}|$ is an upper bound on the votes on any edge (self-recursive rules are included in $\Gamma^{(i)}$) and (2) the voting (majority) construction causes loss of at most an additional factor of 2. Multiplying these costs together attains the bound.

C. Physical Implementation and Optimization

Naively implemented, the formal algorithm 260 is inefficient. In this section, three execution strategies are explained which may be used in various implementations: implicit representation of edges, choosing edge orders and a sort-optimization.

1) Implicit Representation of Edges. If all edge labels in the graph are explicitly stored in basic algorithm 260, then running time would be quadratic in the number of nodes, which is slow at large scale. Instead, it is possible to represent edge types implicitly whenever possible. In one implementation, for example, the [+] edges from soft-complete rules are explicitly stored, but [-] edges are implicitly represented as the complement. The same idea allows efficient processing of the Backward-propagation step: represent a clustering of n nodes, in space O(n), by picking a cluster representative for each cluster and maintaining a mapping of nodes to their cluster representative. Then, two nodes are in the same cluster if and only if they have the same cluster representative.

2) Choosing edge orderings. The basic algorithm 260 can be optimized according to the following observations: (1) any ordering of edges $\Pi$ may be selected that extends $\sqsubseteq$ and (2) it is inefficient to process the [-] neighbors of a node i before the [+] neighbors, since [-] neighbors can never be included in the same cluster as i. Thus, $\Pi$ is chosen so that all [+] neighbors come before any [-] neighbors. After seeing all the [+] neighbors of the nodes, there is no need to explicitly evaluate the [-] edges; they will be converted to [≠] edges.

3) Sort optimization. For some entity relations, there may be no hard constraints. In this case, CLUSTER may be run much more efficiently. The observation is that if the [+]-edges are sorted according to the random ordering $\Pi$, then it is possible to cluster directly in this order: When an edge (i, j) with $\Pi(i)<\Pi(j)$ is encountered, then (1) either i or j has been clustered to another node, in which case nothing is done, or (2) j can be assigned to cluster i. The memory requirements for $\Pi$ are small, since $\Pi$ can be implemented using a (random) hash function. As shown experimentally, this technique can result in a dramatic savings in main memory. However, the required sorting can be done in external memory, where this technique should be even more valuable.

Extensions

In this section, two extensions to Dedupalog are described: using weights and using clean entity lists.

A. Extension 1: Weights and Don't Care Edges

When writing a Dedupalog program, it may be believed that the conclusions of some soft-rules are more trustworthy than others. For example, a string similarity metric often also gives a score, which corresponds to how well it trusts its conclusion. A natural extension to capture this kind of fine-grained knowledge is to add weights. It is relatively straightforward to extend the algorithms to handle weights by casting votes in proportion to the weight.

B. Extension 2: Clean Entity Lists

Often in deduplication scenarios there may be additional pieces of clean data that may be useful to deduplicate the data. For example, there may be a list of clean conference names. One way to leverage this data is by simultaneously clustering the clean list and the dirty data, and placing [≠] edges between each element from the clean list. This is easily expressible as a Dedupalog program. However, if the clean entity list is complete, then it may be expected that every entity reference should be assigned to one of the clean entities. While this complete semantic is desirable, it leads to a difficult algorithmic challenge.

Proposition 5.1: Checking if a clustering program with [≠] constraints and complete clean entity lists has even a single valid clustering is NP-hard in the size of the data. Further, even if assured that the entity reference data can be clustered and there are more than 3 entities in the data, it remains NP-hard to find such a clustering. The reduction is to 3-coloring a graph. The clean entities can be thought of as colors and the [≠] constraints encode edges of the graph. Hence, a clustering is exactly a 3-coloring of the graph. Further, it is known that coloring a 3-colorable graph is hard even with an unbounded number of colors.

Conclusion

Embodiments and features discussed above can be realized in the form of information stored in volatile or non-volatile computer or device readable media. This is deemed to include at least media such as optical storage (e.g., CD-ROM), magnetic media, flash ROM, or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as RAM and/or virtual memory storing information such as CPU instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method for collective deduplication of entity references in data records stored in a database, the method comprising:

executing, on a processor, an execution unit that implements a declarative deduplication language using a clustering algorithm and by accessing the database through a database server, wherein the declarative deduplication language is not a Structured Query Language, the execution unit receiving and executing arbitrary programs in the declarative deduplication language;

accessing one or more relational tables of the database containing data records, where the data records contain references to varying real-world entities, and where the references include a plurality of sets of two or more entity references that are duplicates, wherein duplicates comprise references that have different respective textual representations of a same real-world entity;

receiving entity-reference declarative program code of the declarative deduplication language that specifies entity references in the relational tables that are to be deduplicated;

receiving constraint-specifying declarative program code of the declarative deduplication language that specifies one or more constraints that a deduplication of the entity references should satisfy; and generating output by the execution unit executing the entity-reference declarative program code and the constraint-specifying declarative program code, the output comprising one or more deduplication relations that identify whether or not two entity references are duplicates, and which satisfy the one or more constraints specified in the constraint-specifying declarative program code, wherein each output deduplication relation is an equivalence relation, wherein each equivalence relation partitions the output into corresponding disjoint subsets.

2. A method according to claim 1, wherein the entity-reference declarative program code specifies the entity references by defining one or more relational views over the relational tables using an arbitrary view definition language.

3. A method according to claim 2, wherein each relational view identifies one class of entity references that need to be deduplicated and wherein there can be more than one class of entities.

4. A method according to claim 2, wherein the output comprises one deduplication relation for each entity reference relational view, respectively, wherein a deduplication relation contains all pairs of entity references in the corresponding view that are duplicates referring to a same real-world entity.

5. A method according to claim 1, wherein the constraints specify properties that the deduplication of entity references should satisfy to the extent possible, wherein the constraints comprise both hard constraints and soft constraints, wherein hard constraints must be satisfied by the output deduplication, and wherein soft constraints are hints and the executing comprises attempting to satisfy as many of the soft constraints as possible.

6. A method according to claim 2, wherein the constraints comprise statements in first order logic expressed using Datalog rules, where each Datalog rule comprises a head and a body, where the head comprises an intensional database predicate that corresponds to one of the deduplication relations that forms the output, where the body comprises a conjunction of one or more extensional and intensional database predicates, and where an intensional database predicate corresponds to one of the deduplication relations and an extensional database predicates corresponds to one of the relational tables or an entity reference view.

7. A method according to claim 1 wherein the generating is performed with a clustering algorithm that clusters complete undirected graphs where each edge of a graph is marked with one of four labels comprising a first, second, third, and fourth label, and where the algorithm produces a clustering such that for any edge labeled with the third label the vertices of the edge are placed in the same cluster, for any edge labeled with the fourth label, the vertices of the edge are placed in different clusters, and the sum of number of edges labeled with the first label whose vertices are in different clusters and the number of edges labeled with the second label whose vertices are in the same cluster is minimized.

8. A method according to claim 7 wherein the generating further comprises using an algorithm comprising forward voting and backward propagation to transform the deduplication problem to one or more instances of a clustering problem to be solved by the clustering algorithm.

9. A computer-readable storage media storing information to enable a computer to perform a method of interactive deduplication of data records in a database, the method comprising:

executing, on a processor, an execution unit that implements a declarative deduplication language by accessing the database through a database server, wherein the declarative deduplication language is not a Structured Query Language, the execution unit receiving and executing arbitrary programs in the declarative deduplication language;

accessing one or more relational tables of the database containing data records, where the data records contain references to varying real-world entities, and where the references include a plurality of sets of two or more entity references that are duplicates, wherein duplicates comprise references that have different respective textual representations of a same real-world entity;

receiving entity-reference declarative program code of the declarative deduplication language that specifies entity references in the relational tables that are to be deduplicated;

receiving constraint-specifying declarative program code of the declarative deduplication language that specifies one or more constraints that a deduplication of the entity references should satisfy; and generating output by the execution unit executing the entity-reference declarative program code and the constraint-specifying declarative program code, the output comprising one or more deduplication relations that identify whether or not two entity references are duplicates, and which satisfy the one or more constraints specified in the constraint-specifying declarative program code, wherein each output deduplication relation is an equivalence relation, wherein each equivalence relation partitions the output into corresponding disjoint subsets.

10. A computer-readable storage media according to claim 9, wherein potential duplicates are identified based on string similarity thereof.

11. A computer-readable storage media according to claim 9, wherein a user interacts with a user-interface module to label selected pairs of data records as duplicates or not.

12. A computer-readable storage media according to claim 9, wherein the method combines interactive user labeling and the output of record matching to produce a deduplication using an algorithm for clustering complete undirected graphs.

13. A computer-readable storage media according to claim 9, wherein the constraints comprise statements in first order logic expressed using Datalog rules.

14. A computer-readable storage media according to claim 13, wherein each Datalog rule comprises a head and a body, where the head comprises an intensional database predicate that corresponds to one of the deduplication relations that forms the output, where the body comprises a conjunction of one or more extensional and intensional database predicates, and where an intensional database predicate corresponds to one of the deduplication relations and an extensional database predicates corresponds to one of the relational tables or an entity reference view.

15. A computer-implemented method of deduplicating data records, the method, performed by a processor and memory of one or more computers, comprising:

executing an implementation of a deduplication language, the deduplication language not comprising a Structured Query Language, the implementation executing arbitrary strings in the deduplication language using a clustering algorithm, the implementation:

accessing stored data records in one or more relational tables, the data records representing respective real world entities, wherein some of the data records comprise duplicates that mutually represent same respective real world entities;

receiving strings, in electronic form, constructed by one or more users, each string forming a valid program of the deduplication language, the strings specifying, in accordance with the deduplication language, entity references that are to be deduplicated and specifying constraints that corresponding data records, when deduplicated, must or should satisfy;

executing one of the strings to generate a deduplication of the data records, the deduplication comprising deduplication relations that identify pairs of entity references among the data records that satisfy the constraints of the executed string; and storing in electronic form indicia of the deduplication.

16. A computer-implemented method according to claim 15, wherein the executed string specifies a first table of data records to be deduplicated, and the string also specifies a constraint on a second table related to the first table, wherein when the string is executed the constraint on the second table is satisfied in the resulting deduplicated set of data records.

17. A computer-implemented method according to claim 15, wherein the deduplication language allows for specification of constraints in the form of rules, the rules including at least:

a soft complete rule which causes the module to give bias to deduplication matches if and only if they satisfy the soft complete rule;

a soft-incomplete rule which causes the module to give bias against deduplication matches that violate the soft-incomplete rule;

a hard rule comprising a rule that must be satisfied by any data records deemed to be duplicates; and a complex hard rule specifying that data records in the second table that are related to deduplicate-matching data records in the first table must be matching duplicates.

18. A computer-implemented method according to claim 15, wherein one of the received strings that conforms to the declarative deduplication language comprises a plurality of predicates of the language, a predicate comprising a logic operator having as parameters information identifying respective columns of a database in which the data records are stored.

19. A computer-implemented method according to claim 15, wherein the string is executed by minimizing the number of soft constraints that are violated by deduplicate match clusters.

20. A computer-implemented method according to claim 15, wherein the executing is performed with a clustering algorithm that clusters complete undirected graphs.

* * * * *